May 19, 1942.  R. D. HELLER  2,283,879
APPARATUS FOR MAKING SCREEN CLOTH
Original Filed July 19, 1940  2 Sheets-Sheet 1
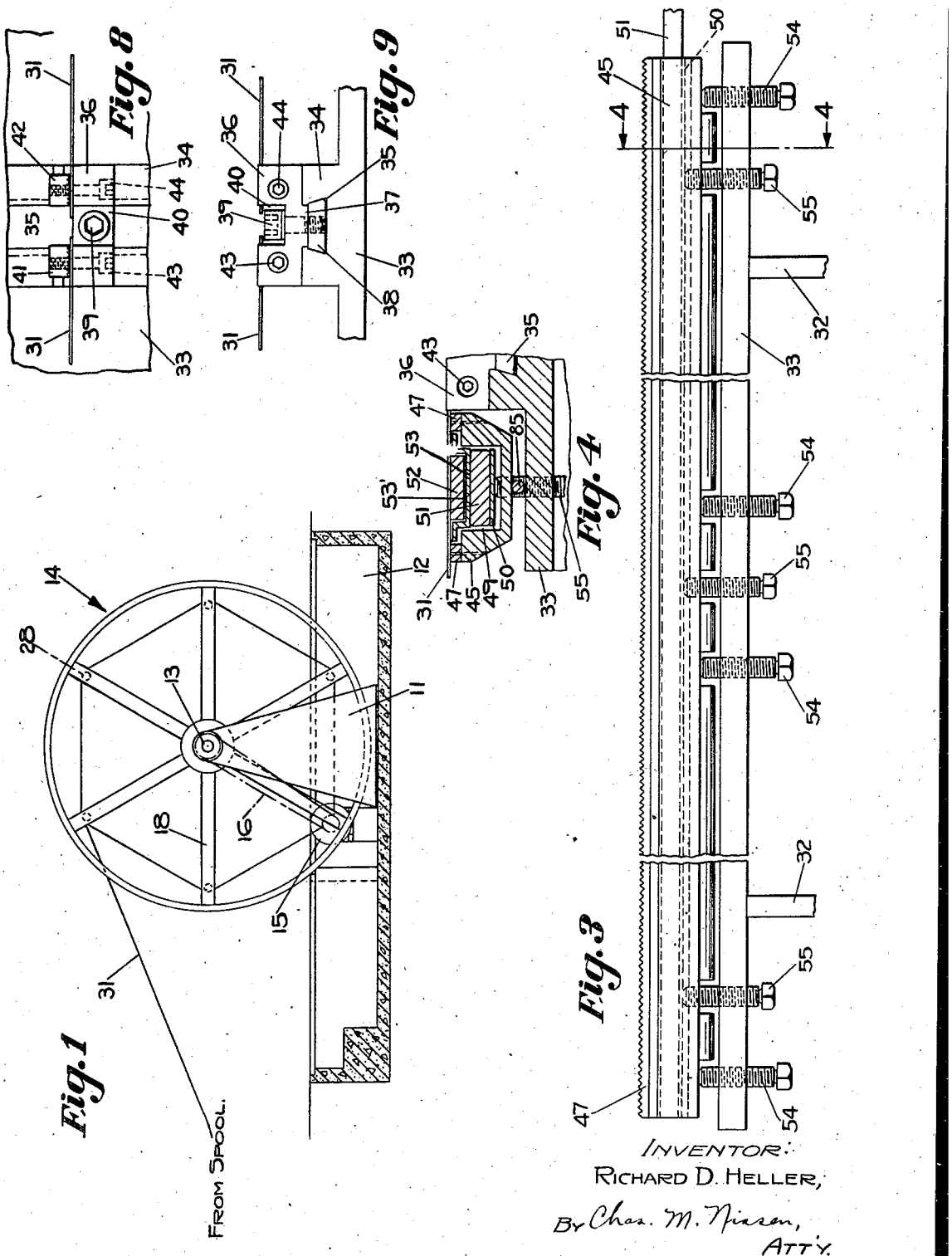
INVENTOR:
RICHARD D. HELLER,
By Chas. M. Niesen,
ATTY.

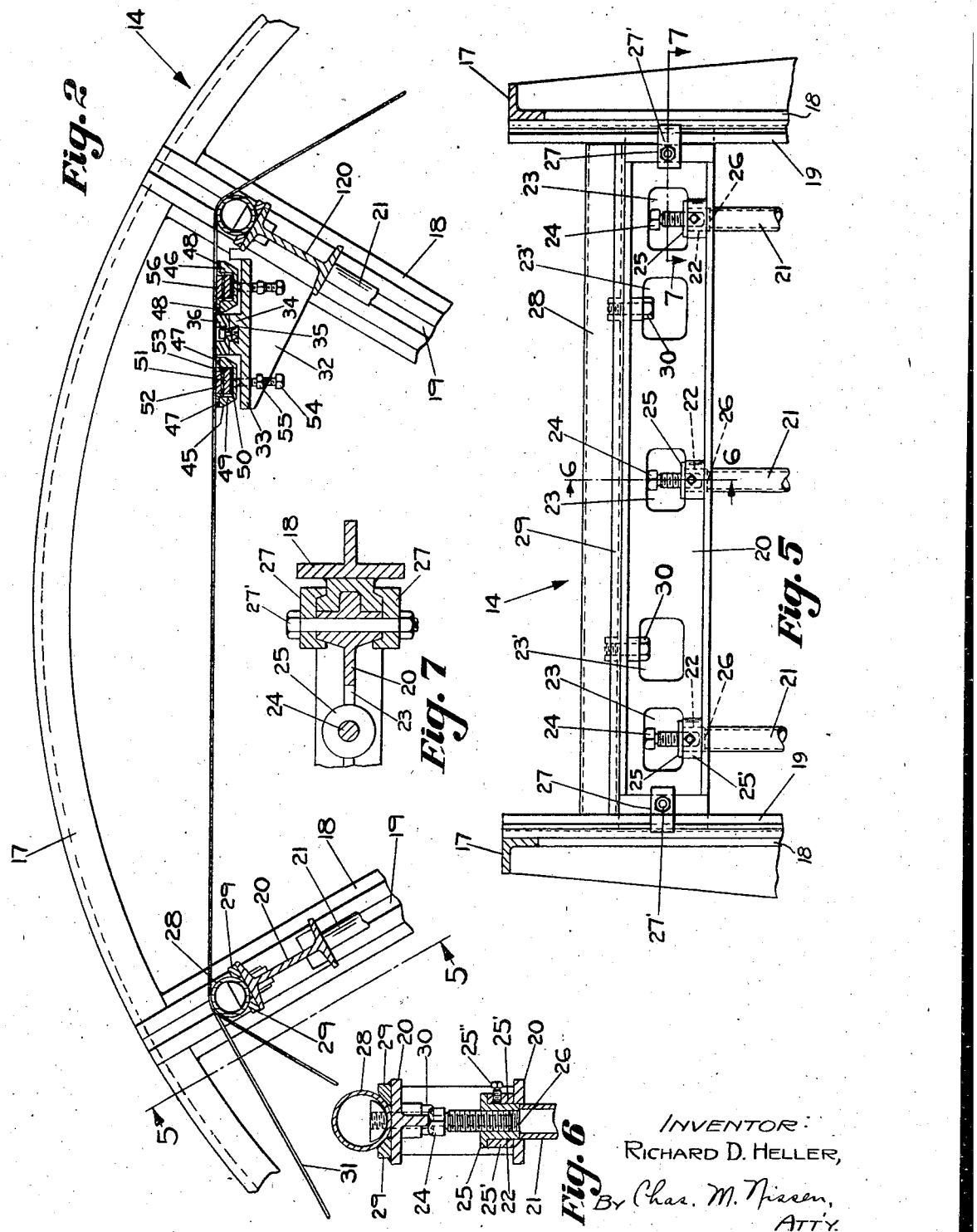

Patented May 19, 1942

2,283,879

UNITED STATES PATENT OFFICE 2,283,879

APPARATUS FOR MAKING SCREEN CLOTH

Richard D. Heller, Columbus, Ohio

Original application July 19, 1940, Serial No. 346,342. Divided and this application April 25, 1941, Serial No. 390,385

20 Claims. (Cl. 242—114)

This invention relates to a new and improved apparatus for making screen cloth, particularly of the type comprising a plurality of parallel strands of wire as distinguished from woven type screen cloth.

One of the objects of the present invention is to provide an improved and efficient reel and mechanism associated therewith by means of which wire screen panels may be produced with a minimum consumption of material.

Another object of the invention is the provision of improved and efficient mechanism for soldering connecting bars to parallel strands of wires in screen panels.

Other objects of the invention will appear hereinafter, the novel features and combinations being set forth in the appended claims.

In the accompanying drawings,

Fig. 1 is a side elevational view showing more or less diagrammatically a winding reel or drum comprising one feature of my invention and which may be employed in carrying out the method comprising another feature of my invention;

Fig. 2 is an enlarged sectional view of a part of the winding reel or drum of Fig. 1;

Fig. 3 is a side elevation of the end bar soldering outfit shown in Fig. 2;

Fig. 4 is an enlarged sectional elevation taken on the line 4—4 of Fig. 3, looking in the direction of the arrows;

Fig. 5 is a transverse sectional and elevational view taken on the line 5—5 of Fig. 2 looking in the direction of the arrows;

Fig. 6 is a sectional elevation taken on the line 6—6 of Fig. 5 looking in the direction of the arrows;

Fig. 7 is a sectional plan view taken on the line 7—7 of Fig. 5;

Fig. 8 is a plan view of a detailed part of the winding reel or drum of Fig. 1 which provides for splicing the wire of the screen cloth; and Fig. 9 is an end view of the structure of Fig. 8.

This application is a division of my co-pending application S. N. 346,342, filed July 19, 1940, for an improvement in Method of and apparatus for making screen cloth.

In carrying out my invention the screen cloth is first started by winding wire under tension, such as high carbon steel wire on a winding reel or drum 14 disclosed in Figs. 1, 2 and 5 of the drawings. This winding reel or drum 14 comprises a main frame formed by a pair of spaced standards, one of which is seen at 11 in Fig. 1 of the drawings and which is supported in a pit 12.

Extending between the standards 11 is a stationary shaft 13 upon which is mounted a drum, reel or rotor 14 which is driven from an electric motor 15 by appropriate chain and sprocket drive mechanism 16 to rotate the rotor 14 in a clockwise direction as viewed in Fig. 1. The rotor 14 is formed by a pair of spaced rings 17, 17 formed of angle members, each of which is provided with a plurality of spokes 18, 18, of which there are six associated with each ring 17, which number of course may be either increased or reduced as desired.

The spokes 18 provide guides 19 adapted to receive slidably the opposite ends of cross members 20 which, as clearly illustrated in Figs. 2 and 7 of the drawings, are preferably in the form of I-beams. The sliding adjustment between the cross members 20 and the guides 19 of course provide adjustment for the radial distance of each cross member 20 from the axis of the shaft 13, and it is manifest that this adjustment will determine the length of wire required to make a complete convolution.

To determine the position of each of the cross members 20, there is provided a plurality of radial pipes 21, of which there are three illustrated in Fig. 5 of the drawings. The pipes 21 each extends from a center housing or hub of shaft 13 on the rotor 14 on which they are received in appropriate recesses, to an appropriate receiving recess 22 in one of the cross-members 20. In practice I employ three of these radial pipes 21 for each of the cross-members 20, and I have a large group of pipes 21 of different lengths so that by removing a group of pipes 21 of one length and substituting a group of different length, the length of a convolution of wire may be variably determined while at the same time the distance of each cross-piece 20 from the axis of rotation of the rotor 14 is substantially the same with any one group of pipes 21.

If desired, provision may be made for tensioning of the wire after it is wound on the rotor 14 before any of the end bars (52, 56 of Fig. 2) are attached and also for the subsequent de-tensioning thereof after the end bars are attached, by devising means for adjusting each of the transverse I-beams 20, a relatively small amount such as an inch or so, with respect to the pipes 21. Such means for adjusting each I-beam 20 may embody a plurality of openings 23 in each of which is a screw 24 threaded into a cylindrical nut 26 having an integral collar 25, which nut 26 extends loosely into the associated recess 22 in the cylindrical spacer 25', and the latter may be integral with the I-beam 20. The bottom of the nut 26 abuts against the associated pipe 21, as shown in Fig. 6. It is evident that by adjusting the screw 24 the head of which bears against the top of the opening 23, the nut 26 will be forced into the recess 22 a variable amount which will be limited by the collar 25 engaging the spacer 25', thus precluding the possibility of forcing the pipe 21 entirely out of recess 22. A set screw 25" may be used to hold the nut 26 in adjusted position relative to the spacer 25'. Within the limits of adjustment provided, it is evident that screw 24 may adjustably determine the relative position of the cross-member 20 with respect to the associated pipes 21 and spokes 18.

After the desired adjustment of the cross pieces 20 has been effected, they are preferably clamped in place by end clamps which are adapted to clamp each cross piece 20 to the associated spokes 18, 18. Such clamps may comprise plates 27 secured to spokes 18, 18 and held against the flanges of the I-beam 20 by means of the bolts 27', 27'. See Figs. 5 and 7.

To provide a smooth bearing surface for the screen cloth wire each of the cross-members 20 is provided at its top with a bearing pipe 28 which is aligned between the guide means 29 in the form of strips welded to the top of the cross piece 20. The bearing pipe may be removably attached to said cross piece 20 by means of machine screws 30 extending into appropriate openings 23', 23' in the cross piece 20, as shown in Fig. 5. The structure of all the cross pieces 20 and associated members is substantially that illustrated at the left of Fig. 2 and in Fig. 5 of the drawings.

Associated with one of said cross pieces 20, as shown at the right of Fig. 2 and in Figs. 8 and 9, is a special structure which is for the purpose of carrying means for attaching two end bars of ultimate sections of screen cloth to the wire which has been wound upon the rotor 14.

Before describing this structure it may be pointed out that the high carbon steel or other wire 31 which forms the screen cloth is wound upon the reel, drum or rotor 14 by rotating the same from the drive motor 15 in a clockwise direction, as viewed in Fig. 1, while the wire 31 is fed from a spool through appropriate wire stranding mechanism and wire tensioning mechanism if desired, until the desired width of screen is formed on said rotor 14. The spacing of the wire 31 may be by appropriate lateral feeding mechanism associated with the wire 31 in cooperation with threaded spacer strips hereinafter described more completely.

Before describing the manner in which the winding of the wire 31 is started, stopped and possibly spliced, attention is directed to Fig. 2 of the drawings and to the mechanism associated with the righthand cross member 120. Attached to said cross member 120 is a plurality of brackets, one of which is seen at 32 to which is attached a plate 33 extending substantially the full length between the two opposite rings 17 of the rotor 14. (Fig. 3.) The plate 33 is provided with a center boss 34 which extends longitudinally the entire length of said plate 33 and which is provided with a dovetailed groove 35 which also extends the full length thereof.

Slidably mounted on the boss 34 is a plurality of clamping members, preferably three in number, having the construction illustrated particularly in Figs. 8 and 9 of the drawings. Each of said clamping members comprises a body 36 having a bottom boss 37 adapted to extend into the groove 35 associated with which is a dovetailed clamping block 38 adapted to receive a machine screw 39 which extends through the boss 37 and threads into said clamping block 38, the head of which is received in a center groove 40 in the body 36. It is manifest that by loosening the machine screw 39 the body 36 may be slid along the boss 34 and by tightening said screw 39 it may be clamped in any desired position.

The body 36 has two separate wire clamping members 41 and 42 spaced on opposite sides of the center groove 40 and provided with separate clamping machine screws 43 and 44 respectively.

As clearly illustrated in Fig. 8 of the drawings, severed ends of wire 31 may be clamped to the body 36 by the clamping members 41, 42. As previously stated there are three pairs of these clamping members 41 and 42. The reason for this number is as follows: There is one of these clamping members or the equivalent thereof adjacent each ultimate edge of the screen as it is wound on the rotor 14. Of course to start the winding of the wire 31 on the rotor 14 a free end must be clamped to something and such a free end is clamped to one of the clamping members which is adjacent one side of the rotor 14. As the rotor 14 rotates, the wire 31 of course progresses laterally across the rotor until the desired width thereof has been wound on the rotor. The width of course is known before the winding operation starts and so the second clamping member is placed at the desired distance from the first clamping member to provide for this desired width of screen cloth, and when the desired width is wound on, the wire 31 is clamped to this second clamping member.

It may be stated that in using the first and second clamping members which are described, the wire will be clamped to both of the clamping members 41 and 42.

The third clamping member is placed loosely on the boss 34 between the first and second so it can be freely adjusted along the groove 35. In case a spool of wire 31 comes to an end or is spliced, it is of course essential to take care of either such condition, and this is done by setting this third clamping member when either such condition arises and clamping the wire 31 as it comes from the spool by the clamping member 42. The wire 31 is then severed adjacent the clamp 42 as clearly illustrated in Fig. 8 of the drawings. If a splice has been effected, the new screen wire 31 is cut so as to eliminate the splicing portion and the free end of this new wire is then clamped by the clamping member 41 and the operation of winding the wire 31 on the rotor 14 is continued. It is to be noted that the wire 31 is very closely adjacent the top of the body 36 and this body 36 is so constructed that if the screen cloth is of relatively fine mesh the successive strands thereof may readily pass over the top of said body 36 without elongating these strands as compared with any strands which are laterally spaced from the body 36 of the intermediate clamping member. It is particularly significant to note as I shall point out more completely hereafter, that the severed wire 31 leading from the clamping members 41, 42 of the intermediate clamp is no detriment whatever to the ultimate screen, because all of the strands of wire are ultimately severed substantially along the line of the boss 34.

After the desired amount of wire 31 has been wound on the rotor 14 to provide the desired width of the screen cloth and the ends have been clamped as above described, the wire 31 as it comes from the spool is of course severed after it is clamped to the final clamp. Under these conditions if it is desired to adjust the tension of the wire 31, this may be done by the previously described set screws 24. With the wire 31 properly tensioned, I then solder or otherwise attach two end bars 52, 56 to the parallel strands of wire 31, which end bars ultimately are end bars of different sections of screen cloth; that is, the length of each convolution of wire 31 which is wound on the rotor 14 is sufficient to make up two or more sections or panels of screen cloth rather than being only long enough to make up only one section. To effect the attachment of these two end bars which, as previously pointed out, will ultimately be associated with different sections of screen cloth, there is provided a pair of channel members 45 and 46 (Fig. 2) which extend longitudinally with respect to the plate 33 and boss 34 and transversely with respect to the axis of the wire 31, said channel members 45 and 46 being on opposite sides of said boss 34.

Adjacent each edge of the channel member 45 is a strip 47 which has a plurality of spaced grooves therein which correspond with the mesh of the screen cloth which is to be formed. One way of making these strips 47 is to take a threaded pipe which has a number of threads per inch which corresponds with the mesh of screen cloth desired, and cutting the pipe into longitudinal strips about ½" wide which are held between spaced holding means, one at each end of the channel member 45. The channel member 46 is also preferably provided with channel strips 48.

At the bottom of the trough 49 there is loosely placed a bearing strip or plate 50 upon which is placed a longitudinally extending heater element 51 preferably in the form of an electrical heater upon which is placed an end bar 52 which is ultimately soldered to the successive strands of wire 31. See Fig. 4. Interposed between the end bar 52 and heater 51 and extending along the sides thereof is a metal tray 53 for supporting therein and thereon a strip of asbestos 53'. It may be stated that the channel member 45, the heater element 51 and the asbestos 53' are fundamental structure, inasmuch as it is preferred that the asbestos be between the bar 52 of the heater element 51.

In order to provide adjustments for effecting the proper relation between the parallel strands of wire 31 and the end bar 52 prior to the soldering operation, two separate adjustments are provided which I shall now describe.

Extending longitudinally of the plate 33 under the channel 45 and threaded therethrough is a plurality of set screws 54 (Fig. 3) which abut against the bottom of the channel 45. It is thus evident that by adjusting these set screws 54 the channel member 45 may be elevated with respect to the plate 33. This not only makes possible the levelling of the channel member with respect to the plane of the strands of wire 31 but is particularly effective to force the grooved strips 47 into intimate contact with the strands of wire 31 thus insuring the proper spacing of said wires 31 before the end bars 52 are soldered in place.

It is also desirable to force the end bar 52 against the successive strands of wire 31 independently of the above described action in forcing the strips 47 thereagainst and to this end there is another set of a plurality of set screws 55 which thread through the plate 33 and which extend freely through non-threaded openings in the bottom of channel member 45 and bear against the bearing plate 50. These set screws 55, like the set screws 54, are distributed along the longitudinal length of the channel 45 (Fig. 3), and consequently when said set screws are adjusted they force the bearing plate 50, the heater element 51 and the end bar 52 upwardly, thereby insuring intimate contact between said end bar 52 and the strands of wire 31. This also insures intimate contact between the heater element 51 and the end bar 52 through the asbestos element 53'. This insures a good transfer from the heater element 51 to the end bar 52. The interposed auxiliary channel 53 and sheet asbestos 53' will become heated up in a short time and does not prevent an effective transfer of heat from heater element 51 to end bar 52, which heat of course is employed to melt the solder which attaches the wires 31 to end bar 52.

Associated with the channel member 46 is the same combination of elements which I above described in association with the channel member 45, and consequently they need not be described in detail.

The operation of the apparatus so far described with the consequent realization of so much of the method which is performed thereby may now be preferably described by way of review. The free end of the spool of wire 31 to be used in forming the screen cloth is attached to one end clamp member 36, 37, etc., as shown in Fig. 8, after the cross-members 20 have been adjusted as previously described to produce a length of screen cloth which is sufficient to make the number of screen panels each of the predetermined length desired. For example, suppose it is desired to make two screen panels each 5' long and 3' wide. Under these conditions the cross-members 20 are adjusted so that the length of any convolution of wire 31 is slightly in excess of 10', the excess being as little as possible in order to reduce waste to a minimum.

With the free end of wire 31 attached to one side of the rotor 14, the latter is rotated by means of the motor 15 and the wire 31 wound up, the wire being fed laterally at a rate determined by the desired mesh of the screen cloth. Any splicing of the wire 31 will be eliminated as above described.

When the width of the cloth on the rotor 14 has reached the desired value which, in the illustration given, is 3', the wire 31 will be clamped to the second clamp 36, 37 etc., and the end thereof severed. Thereupon the channel members 45 and 46 which were previously removed from the plate 33 during the entire winding operation are put in place together with the parts associated with them which were previously described. The set screws 54 and 55 are then successively adjusted, the first to bring the strip 47 into intimate contact with the successive strands of wire 31, and the latter to force the end bar 52 in intimate contact with said successive strands of wire 31. It is to be understood that a duplicate operation and duplicate equipment is provided in association with the two channel members 45 and 46 so that there will be two spaced apart bars attached to the convolutions of wire 31. Thereafter each of these two bars, that is, the end bar 52 associated with the channel member 45 and another end bar 56 associated with channel member 46 are soldered in place as aforedescribed, it being understood that the inner edges of the two end bars 52 and 56 are ultimately to be the outer extremities of separate panels of screen cloth.

After said end bars 52 and 56 have been soldered or otherwise attached to the convolutions of wire 31, said convolutions are cut along the line of trough 40. If this cutting operation were performed while the convolutions of wire 31 were under tension as they are before and during the soldering operation, damage might be done either to the mechanism, the screen cloth or the operator; so to relieve the tension one or more of the cross-members 20 are adjusted towards the axis of rotor 14 by adjusting the set screws 24 associated therewith after the clamp means 27 has been released.

With the convolutions of wire 31 severed as aforedescribed, it is of course evident that the elongated panel of screen cloth may readily be removed from the rotor 14 and there will be an end bar at each end with the ends of wire extending slightly beyond each end bar. These wire ends are then cut to a desired length if necessary and bent over with an extended strip of metal which preferably extends over the outer end of each bar as described completely in my Patent No. 2,220,106, granted November 5, 1940, for an improvement in Screen cloth and method of making same.

After the desired number of end bars are attached, the panel of screen cloth has its tension slackened by retracting the screws 24 or the screws 54, 55 or all of these screws, whereupon the panel is cut between each pair of end bars which, in the illustration given, will be between the end bars 52 and 56. Thereafter, if the extended lengths of wire beyond the end bars are excessive, they will be clipped off, bent over said end bars and covered by strips of tin plate which extend beyond each edge of the associated end bar 52 or 56 and also bent over as shown in my above mentioned Patent No. 2,220,106. In other words, the bent over ends of the wires may have soldered thereto strips of tin plate likewise bent over to cover the end portions of the wires 31 including the bent over ends.

As previously indicated, it is possible to make more than two sections or panels of screen cloth on the reel, and the number of such sections or panels can be readily determined in advance by the available length of each convolution and the length of each section or panel desired. The number of persons that can operate on the panel of screen cloth will vary with many conditions, but it is evident that more than one person may be operating on it at the same time in attaching end bars or cross strips.

As shown in Fig. 4, the screw 55 is threaded through the plate 33 (Fig. 2) but extends loosely through an opening in the bottom of the channel 45. A transverse pin 85 extending through the screw 55 serves to carry the channel 45 upwardly and at the same time the channel may tilt or rock on the pin 85 to equalize the pressure of strips 47, 47 on the wires 31. The pin 85 also acts as a stop to limit the extent to which the screw 55 may be moved upwardly and this limit stop action serves to hold the end bar 52 against the wires 31 with a predetermined pressure.

As shown in Fig. 3, the platform 33 is supported by two spaced-apart brackets 32, 32 and since the convolutions of wire are all within the limits of the end wheels of the reel the length of the platform 33 is approximately coextensive with the spacing of these wheels. After the ends of the wire convolutions are secured by means of the clamping mechanism shown in Figs. 8 and 9 the wires are preferably subjected to tension by moving one or more of the pipes 28 radially outward. When the wires are taut operation of the soldering apparatus shown in Figs. 2 and 4 is facilitated. After the end bars have been soldered to the convolutions of wires above the platform 33, the tension on the wires may be relieved by retraction of one or more pipes 28, whereupon the wires between the attached bars 52, 56 may be severed.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In apparatus of the class described, the combination with a screen cloth winding reel comprising a rotor, of a platform thereon adapted to receive a pair of end bar attaching members extending parallel with the axis of rotation of said rotor, and mechanism for adjusting said end bar attaching means relative to said platform.

2. In apparatus of the class described, the combination with a reel, of a platform mounted thereon, and a pair of end bar attaching means mounted on said platform.

3. A screen cloth winding reel comprising the combination with a rotor having a plurality of cross-members on which convolutions of wire are adapted to be wound, of means for holding the ends of the wire convolutions wound on such reel, and means for adjusting the radial distance of each cross-member from the axis of rotation of the reel so that an adjustable predetermined length of screen panel may extend around the reel.

4. A screen cloth winding reel comprising the combination with a reel having a plurality of circumferentially spaced cross-members on which convolutions of wire are adapted to be wound, of a pair of end bar attaching means supported by one cross-member, and means for adjusting the radial distance of one of the cross-members from the axis of rotation of the reel to predetermine the length of the screen panel between said pair of end bar attaching means.

5. A screen cloth winding reel comprising the combination with a rotor having a plurality of cross-members, on which the convolutions of a wire are adapted to be wound, a pair of wire clamps mounted on one of said cross-members for gripping the ends of the wire of the wound convolutions, an intermediate wire clamp on said cross-member between said pair of wire clamps, and mechanism supporting said intermediate wire clamp for adjustment along said cross-member to accommodate itself to severed ends of one convolution of wire, such severance being for the purpose of eliminating a splicing of the wire before passing on to the reel.

6. A screen cloth winding reel comprising the combination with a rotor having a plurality of spaced cross-members each radially adjustable relative to the axis of rotation of the rotor, of means for holding the wire convolutions wound on such reel, and mechanism for moving said cross-members radially from such axis to place the wires in tension to facilitate the securing of transverse bars to such wires.

7. A screen cloth winding reel comprising the combination with a reel having a plurality of circumferentially spaced cross-members on which convolutions of wire are adapted to be wound, of end bar attaching means supported by one cross-member, and means for moving one of said cross-members radially outward from the axis of rotation of the reel to place the wires under tension to facilitate the operation of said end bar attaching means.

8. A screen cloth winding reel comprising the combination with a rotor on which convolutions of wires are adapted to be wound, of a pair of wire clamps mounted on said rotor for gripping the ends of the wound convolutions, intermediate clamping means, and mechanism on said rotor supporting said intermediate clamping means for adjustment to accommodate itself to severed ends of an intermediate convolution of wire, such severance and intermediate clamping being for the purpose of eliminating a splicing of the wire before passing on to the reel.

9. A screen cloth winding reel comprising the combination with a rotor on which convolutions of wire are adapted to be wound, of a pair of wire clamps mounted on said rotor for gripping the ends of the wound convolutions of wire, an intermediate wire clamp, and mechanism on said rotor for guiding such intermediate wire clamp toward either end of the rotor to accommodate such intermediate wire clamp to severed ends of an intermediate convolution of wire thereby eliminating the necessity of splicing the wire before being wound on the reel.

10. A screen cloth winding reel comprising the combination with a rotor on which convolutions of a wire are adapted to be wound, of a pair of wire clamps mounted on said rotor for gripping the ends of the wire of the wound convolutions, an intermediate wire clamp, guiding mechanism for said intermediate wire clamp extending toward opposite ends of the rotor, and means for securing said intermediate wire clamp in adjusted position between the ends of the rotor.

11. A screen cloth winding reel comprising end wheels each having a plurality of radial spokes, with cross-members between spokes of one end wheel and corresponding spokes of the other end reel, of a pair of wire clamps on one of said cross-members, an intermediate wire clamp on the last-named cross-member, tongue and groove mechanism extending along such cross-member for guiding said intermediate clamp between said wheels, and mechanism for securing said intermediate wire clamp in adjusted position, the construction and arrangement being such that the ends of a convolution of wire wound on said rotor may be held by said first-named pair of wire clamps and the intermediate clamp may hold the ends of any convolution to avoid the necessity of splicing the wire before winding.

12. A screen cloth winding reel comprising the combination with spaced-apart end wheels each having radial spokes, of means connecting the centers of said wheels to rotate as a unit, I-beams connecting corresponding spokes of said wheels, pipes mounted on the outer edges of said I-beams, mechanism for adjusting said I-beams together with the pipes radially along said spokes, and means for clamping the ends of said I-beams to said spokes in their adjusted positions.

13. A screen cloth winding reel comprising the combination with spaced-apart end wheels, of a shaft connecting the centers of said wheels, cross-members connecting corresponding spokes of said wheels, a plurality of radial pipes between the hub of said wheel and each of said cross-members, means for guiding the ends of said cross-members along said spokes, and mechanism between the said cross-members and the outer ends of said radial pipes for moving said cross-members radially along said spokes.

14. A screen cloth winding reel comprising the combination with spaced apart end wheels each comprising spokes extending radially outward from a hub, of a plurality of cross-members between corresponding spokes of the end wheels, radial abutment mechanism between the said hub and one of said cross-members, and means between said radial abutment mechanism and said last-named cross-member for adjusting the latter along the spokes connected thereby.

15. A screen cloth winding reel comprising the combination with a rotor having an adjustable cross-member, of aboutment mechanism, and mechanism between said cross-member and said abutment mechanism for radially adjusting said cross-member.

16. A screen cloth winding reel comprising the combination with a rotor having a cross-member, of a pipe extending along said cross-member, a retainer extending along the interior of said pipe, and screw mechanism for securing said retainer and pipe rigidly to said cross-member.

17. A screen cloth winding reel comprising the combination with a rotor having a cross-member, of abutment mechanism comprising an abutment, and means between said abutment mechanism and said cross-member to adjust the latter radially of the axis of the rotor, said adjusting means comprising a nut connected to the cross-member and to the said abutment for receiving a screw the head of which engages said cross-member.

18. A screen cloth winding reel comprising the combination with a rotor having a cross-member, of abutment mechanism comprising an abutment extending into an opening in the bottom of said cross-member, a nut with its inner end in engagement with said abutment, a spacer engaging said cross-member at said opening, a collar at the outer end of said nut in engagement with said spacer, and a machine screw threaded into said nut with its head in engagement with said cross-member.

19. A screen cloth winding reel comprising the combination with a rotor, of a cross-member, mechanism for guiding the ends of said cross-member radially, and clamping mechanism between the ends of said cross-member and said rotor to hold the cross-member in adjusted position relative to said rotor.

20. A screen cloth winding reel comprising the combination with a rotor composed of spaced spoked wheels connected by a hub at their centers of rotation, of cross-members between corresponding spokes of said wheels, guiding mechanisms between the ends of at least one of said cross-members and the corresponding spokes of said wheels, means for adjusting said last-named cross-member along said guiding mechanisms to vary the distance of said cross-member from the axis of rotation of said rotor, and clamping mechanisms between such adjustable cross-member and said guiding mechanisms to lock the cross-member in adjusted position.

RICHARD D. HELLER.